United States Patent [19]
Klose

[11] Patent Number: 4,979,775
[45] Date of Patent: Dec. 25, 1990

[54] AXIALLY DISPLACEABLE WINDOW SHADE FOR WINDSHIELD OR THE LIKE

[75] Inventor: Odo Klose, Wuppertal, Fed. Rep. of Germany

[73] Assignee: Gebr. Happich GmbH, Fed. Rep. of Germany

[21] Appl. No.: 321,988

[22] Filed: Mar. 10, 1989

[30] Foreign Application Priority Data

Apr. 20, 1988 [DE] Fed. Rep. of Germany ....... 3813153

[51] Int. Cl.$^5$ ............................................... B60J 3/02
[52] U.S. Cl. ................... 296/97.1; 296/97.4; 296/97.8; 296/97.9; 296/97.11; 160/171; 160/242; 160/370.2
[58] Field of Search ................ 296/97.8, 97.9, 97.11, 296/97.1, 97.4; 160/171, 242, 246, 250, 370.2 DIG. 3

[56] References Cited

U.S. PATENT DOCUMENTS

| | | | |
|---|---|---|---|
| 1,741,609 | 12/1929 | Brooks | 296/97.8 |
| 1,932,475 | 10/1933 | Peteler | 296/97.8 X |
| 2,747,927 | 5/1956 | Burkhead | 296/97.8 |
| 4,468,062 | 8/1984 | Marcus et al. | 296/97.8 |
| 4,707,018 | 11/1987 | Gavagan | 160/DIG. 3 X |
| 4,836,263 | 6/1989 | Ament | 160/370.2 X |

FOREIGN PATENT DOCUMENTS

| | | |
|---|---|---|
| 495025 | 4/1930 | Fed. Rep. of Germany . |
| 513642 | 12/1930 | Fed. Rep. of Germany ..... 296/97.8 |
| 534438 | 9/1931 | Fed. Rep. of Germany ..... 296/97.8 |
| 1089645 | 9/1960 | Fed. Rep. of Germany ..... 296/97.8 |
| 1729921 | 7/1971 | Fed. Rep. of Germany . |
| 3231684 | 3/1984 | Fed. Rep. of Germany . |
| 3338515 | 5/1985 | Fed. Rep. of Germany . |

Primary Examiner—Margaret A. Focarino
Assistant Examiner—Andrew C. Pike
Attorney, Agent, or Firm—Ostrolenk, Faber, Gerb & Soffen

[57] ABSTRACT

A window shade includes a winding shaft and a shade strip. The shaft cooperates with a support such that the shaft is axially displaced when the strip is pulled past a window or wound back onto the shaft.

15 Claims, 2 Drawing Sheets

AXIALLY DISPLACEABLE WINDOW SHADE FOR WINDSHIELD OR THE LIKE

BACKGROUND OF THE INVENTION

The invention relates to a window shade, especially useful for a window of generally trapezoidal shape, like the windshield of an automobile. There are two supports for a winding shaft. The supports are arrangeable on a window frame and are spaced a distance from each other. The window shade strip is fastened by one of its edges to the winding shaft Window shades of this type serve chiefly as protection from the sun. Various embodiments are known They are generally provided with cylindrical winding shafts and (for instance, German Unexamined Application for Patent Nos. OS 32 06 140) have their winding shafts arranged in a horizontal orientation on the upper frame molding of windows. The arrangement of a window shade on the lower frame molding of a vehicle window is also known (for instance, German Unexamined Application for Patent No. OS 29 43 249).

When such window shades are arranged in front of rectangular windows, there is no difficulty in achieving adequate screening of the window with a correspondingly rectangular window shade strip. But the situation is different when the window shades are to be used for the screening of windshields of vehicles. Windshields are usually not rectangular, but are instead generally trapezoidal in shape. Despite the use of two window shades for covering a windshield, there are relatively large unscreened areas that present a corresponding danger of glare.

SUMMARY OF THE INVENTION

The object of the invention is to provide a window shade that substantially improves screening of a windshield, and thus improves the protection against sunlight and against light from oncoming vehicles For the attainment of this object, according to the invention, the winding shaft is mounted for axial displacement. This enables the window shade strip to be moved to cover over areas of the windshield through which there is an increased danger of glare According to the invention, the winding shaft can be mounted so that axial displacement of the shaft takes place automatically as a result of the rotary motion upon winding and unwinding of the window shade strip. For this purpose, the winding shaft can be connected for axial displacement to at least one of the shaft supports via a screw thread In particular, on at least one end region, the winding shaft has an internal thread which is received by a fixed threaded spindle of the support.

In a preferred embodiment of the invention, the winding shaft carries a generally trapezoidal window shade strip, which is oblique on one lateral side. That window shade strip is fastened to the shaft by the shorter straight edge of the strip. The trapezoidal window shade strip can, of course, be exactly adapted to the shape of the entire windshield or preferably to the shape of one side of the windshield, so that between the oblique edge of the window shade strip and the correspondingly obliquely extending A-column of the vehicle, there remains no unscreened gap that could give rise to glare. The axial movement of the winding shaft is to be adapted to the actual obliqueness of the window shade strip so that the oblique edge of the window shade strip is always oriented parallel to the correspondingly obliquely extending A-column of the vehicle.

In a further embodiment of the invention, a further strip is fastened to the free edge of the window shade strip. The further strip is oriented parallel to the winding shaft and extends beyond the window shade strip on one side, usually toward the window frame of the vehicle. At its free end region, the further strip carries a guide element that is connected to a guide that is arranged on the window frame and that extends parallel to the oblique edge of the window shade strip.

The winding shaft may be equipped with an automatic winder, possibly driven by an electric motor. It is also possible to use a winding shaft with an internal spring-tension device and to unwind the window shade strip against the spring tension via the guide element. The guide element is possibly provided with an automatic electromechanical movement means for unwinding the window shade strip.

Other objects and features of the present invention will become apparent from the following description of a preferred embodiment of the invention considered in conjunction with the accompanying drawings.

DESCRIPTION OF THE PREFERRED EMBODIMENT

Figure 1:
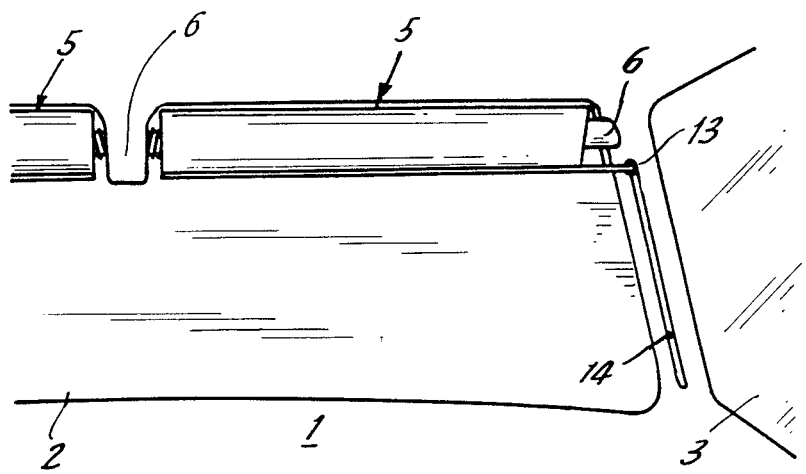
FIG. 1 is a partial view of the interior of a passenger vehicle at the windshield with two window shades arranged above the windshield and the window shade strips shown rolled up.

The drawings partially show the interior of a passenger vehicle at the windshield. The passenger automobile 1 has a windshield 2, a side window 3, an A-column 4 located between windows 2 and 3, and two window shades 5 arranged above the windshield 2 on the vehicle 1. As illustrated in FIG. 1, the window frame to the side of the window is inclined corresponding to the difference in the lengths of the one and opposite ends of the window. The window 2 is narrower at one end thereof than at the opposite end thereof.

Each window shade 5 has two support brackets or supports 6 at a top of the windshield. The respective supports for each shade are spaced a distance apart. A cylindrical, hollow winding shaft 7 is supported between the support brackets at the narrower, top in the drawings, end of the window. A window shade strip 8 is fastened by one non-oblique edge to the periphery of the shaft 7 Each winding shaft 7 has an internal thread 9 (in a hollow interior thereof) on one end. An externally threaded spindle 10 carried on one of the support brackets 6 extends in the threaded interior of the shaft 7. The threads of the spindle 10 are complementary to the threads of the shaft 7. At its other end, the winding shaft 7 is arranged like a journal bearing on a trunnion 11. By this support of the winding shaft 7, axial displacement of the winding shaft takes place automatically upon its rotary motion. The path of displacement is determined by the thread pitch selected in each case The drawings further show that the window shade strip 8 is of trapezoidal shape. The short edge of the window shade strip 8 is fastened to the winding shaft 7 in the customary manner of shades, and this is not shown here in detail. The lower, long edge of the window shade strip 8 extends parallel to the upper, short edge. The lower edge is fastened to a rigid guide strip 12 which extends over the length of the lower edge generally parallel to the winding shaft and also extends beyond the lower edge in the direction toward the A-column 4. The edge of each window shade strip 8 that faces the longitudinal center line of the vehicle extends at an approximately right angle to the strip 12, while the side edge adjacent to the A-column extends obliquely, widening toward the strip 12, preferably in accordance with the slope angle of the A-column 4 and intersects both the short top edge and the long lower edge of the window shade strip.

On its free protruding end, the strip 12 carries a guide element 13 which cooperates with a guide track 14 on the surface of the A-column. The guide track 14 extends obliquely with respect to the winding shaft 7. The side edge of the window shade strip 8 adjacent to the A-column is generally parallel to the guide track 14. The guide track 14 can, for example, be a rod or a groove made in, for example, a dovetail shape. The guide element 13 is complementary in shape to the guide track.

The winding shaft 7 may be provided with a conventional rewind mechanism, possibly the conventional window shade spring 16 and possibly also a rewind mechanism driven by an electric motor 17 connected with the vehicle electrical system. An internal spring tension device within the winding shaft would provide rewind and would also bias the window shade strip 8 to be stiff and smooth.

Unwinding of the window shade strip may be accomplished manually by pulling on the strip 12 or on the bottom of the window shade strip 8 itself. Automatic means for unwinding the window shade strip may also be provided. For example, the guide element 13 or track 14 may be provided with an automatic electromechanical movement means, which when electrically operated, moves the guide element, strip 12 and shade strip 8 down, and which, when released, frees the shade strip for rewind according to any of various known techniques.

Figure 2:
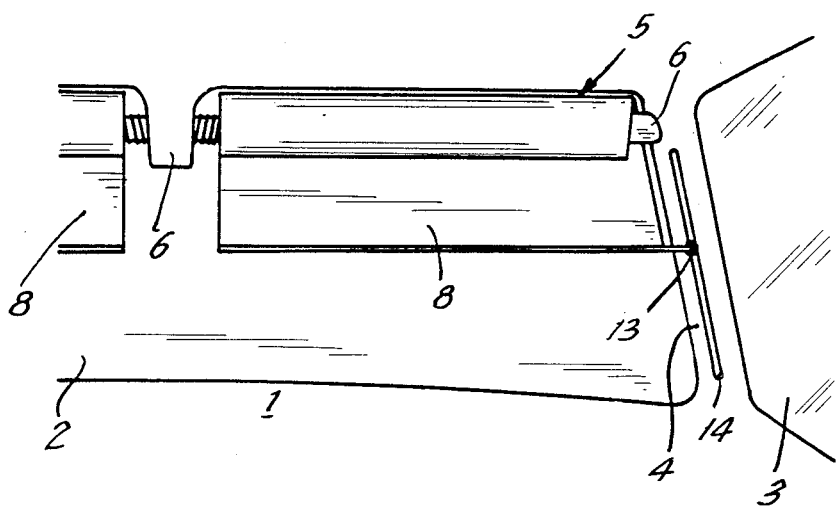
FIG. 2 is a partial view in accordance with FIG. 1, with each of the window shade strips partially unrolled.
Figure 3:
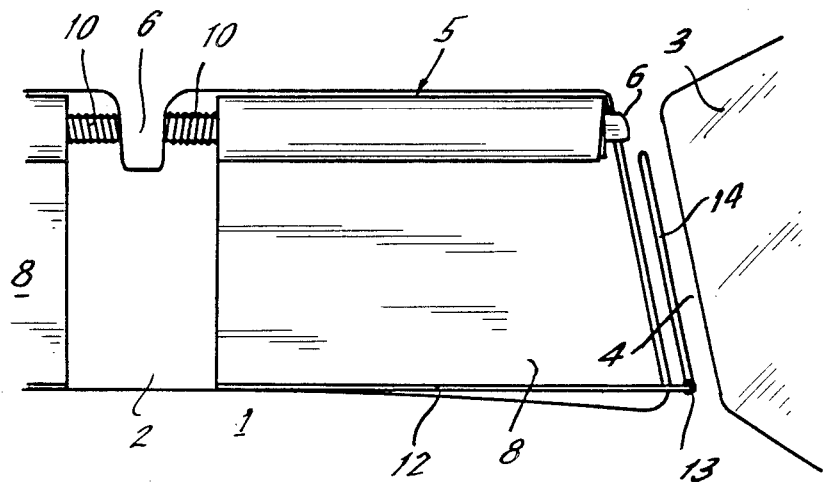
FIG. 3 is a partial view in accordance with FIGS. 1 and 2, with the window shade strips completely unrolled.
Figure 4:
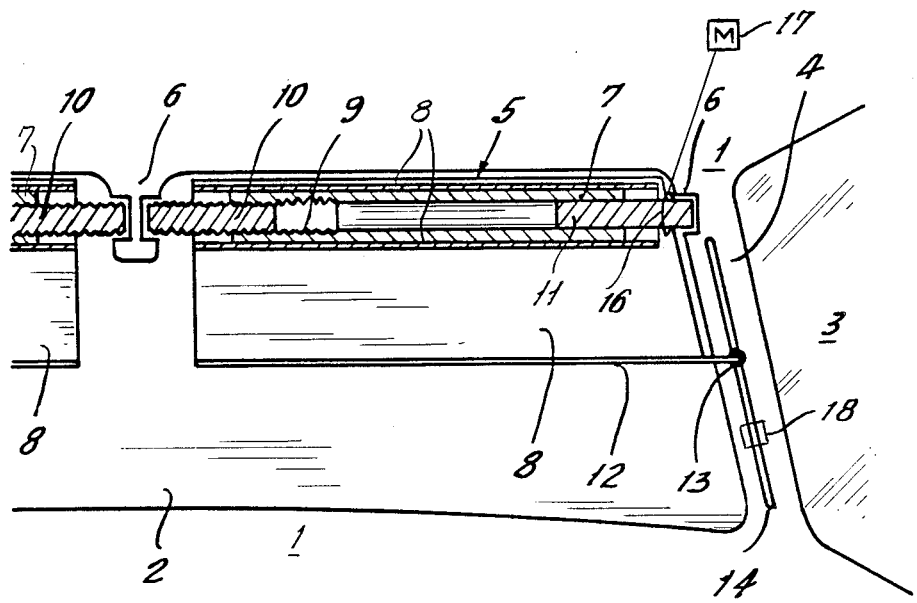
FIG. 4 is a partial view corresponding to FIG. 2, with the winding shafts illustrated in longitudinal cross section.

Starting from the condition of FIG. 1, when the window shade strip 8 is unwound from the winding shaft 7, in addition to its rotary unwinding motion, the winding shaft 7 is also axially displaced. As a result, the edge of the window shade strip adjacent to the A-column 4 remains always oriented parallel to the A-column 4 and the guide element rides along the track 14, without the strip 12 being displaced laterally with respect to the shade so as to keep the shade smooth and to prevent wrinkling FIG. 2 shows about half, and FIG. 3 shows all, of the total path of displacement of the winding shaft 7 upon unwinding of the shade strip. Note the elongation of the exposed part of the spindle 10. Between the A-column 4 and the window shade strip 8, no gap develops through which glaring light might enter.

In the middle region of the windshield 2, however, there is a region which is not screened by the window shade strips 8. If necessary, this area can be screened with an additional window shade, such as a rectangular window shade strip Although the present invention has been described in connection with a preferred embodiment thereof, many other variations and modifications will now become apparent to those skilled in the art. It is preferred, therefore, that the present invention be limited not by the specific disclosure herein, but only by the appended claims

What is claimed is:

1. A window shade operable for covering a window, comprising two supports, spaced apart from each other for being arranged on a frame of the window;

a winding shaft carried by the supports and rotatable about an axis of the winding shaft with respect to the supports, the winding shaft being carried by the supports in a manner enabling axial displacement of the winding shaft with respect to the supports;

a windable window shade strip having a first edge which is fastened on the winding shaft and an opposite second edge which can be drawn with the shade strip past the window; and means in the winding shaft and in a first one of the supports for automatically axially displacing the winding shaft upon rotary movement of the winding shaft.

2. The window shade of claim 1, wherein the supports are arranged at the frame.

3. The window shade of claim 2, wherein the window shade strip is generally trapezoidal in shape and has a side edge generally corresponding in incline to a corresponding edge of the window.

4. The window shade of claim 3, wherein the window is narrower at one end thereof than at an opposite end thereof and the window frame is inclined correspondingly to the difference in a length of the one end and a length of the other end, the winding shaft being located at the narrower end of the window.

5. The window shade of claim 3 further comprising a guiding strip attached to the second edge of the window shade strip, the guiding strip being generally parallel to the winding shaft, the guiding strip extending beyond the window shade strip and toward the frame; and a guide element on the guiding strip and a cooperating guide track on the window frame, the guide element being engaged with the guide track such that the guide element rides along the guide track.

6. The window shade of claim 2, further comprising a guiding strip attached to the second edge of the window shade strip.

7. The window shade of claim 6, wherein the guiding strip is generally parallel to the winding shaft, the guiding strip extending beyond the window shade strip and toward the frame; and a guide element is on the guiding strip and a cooperating guide track is on the window frame, the guide element being engaged with the guide track such that the guide element rides along the guide track.

8. The window shade of claim 7, wherein the window shade strip has a side edge that intersects the first edge and the second edge, the side edge extending along the window frame, the side edge being generally parallel to the guide track.

9. The window shade of claim 8, wherein the guide track extends obliquely with respect to the winding shaft.

10. The window shade of claim 1, wherein the means for displacing the winding shaft comprises a threaded connection between the winding shaft and the first support, such that rotation of the winding shaft with respect to the first support, through the threaded connection, axially displaces the winding shaft with respect to the first support.

11. The window shade of claim 1, further comprising a fixed threaded spindle carried on the first support, the winding shaft having a thread which is complementary to the thread of the spindle to receive the thread of the spindle, such that rotation of the winding shaft with respect to the first support and with respect to the spindle displaces the winding shaft axially.

12. The window shade of claim 11, wherein the spindle is fixed to the first support and is externally threaded, and the winding shaft has an end region which is internally threaded for cooperating with the external thread of the spindle.

13. The window shade of claim 1, further comprising an automatic rewinder for rewinding the winding shaft after the window shade strip is unwound.

14. The window shade of claim 13, wherein the automatic rewinder comprises a spring.

15. The window shade of claim 14, further comprising unwinding means for unwinding the window shade strip from the winding shaft.

* * * * *